(12) United States Patent
Adoni et al.

(10) Patent No.: US 10,614,502 B2
(45) Date of Patent: Apr. 7, 2020

(54) IN-STORE REAL-TIME FOOD ITEM SELECTION RECOMMENDATIONS

(71) Applicant: INTERNATIONAL BUSINESS MACHINES CORPORATION, Armonk, NY (US)

(72) Inventors: Siddique M. Adoni, Bangalore (IN); Norbert Herman, Denver, CO (US); Shubhadip Ray, Somerset, NJ (US); Dhandapani Shanmugam, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 974 days.

(21) Appl. No.: 14/885,188

(22) Filed: Oct. 16, 2015

(65) Prior Publication Data

US 2017/0109806 A1    Apr. 20, 2017

(51) Int. Cl.
G06Q 30/00    (2012.01)
G06Q 30/06    (2012.01)

(52) U.S. Cl.
CPC .................... *G06Q 30/0631* (2013.01)

(58) Field of Classification Search
None
See application file for complete search history.

(56) References Cited

U.S. PATENT DOCUMENTS 8,429,026 B1 *   4/2013   Kolawa .................. G06Q 30/00
                                                        705/26.7
8,956,303 B2     2/2015   Hong et al.
2003/0158465 A1  8/2003   Galli
(Continued)

FOREIGN PATENT DOCUMENTS

WO        03017045 A2    2/2003
WO    2014085764 A1    6/2014
(Continued)

OTHER PUBLICATIONS

Hadi Salah, Emily MacIntosh, Nirusan Rajakulendran; "Wearable Tech: Leveraging Canadian Innovation to Improve Health"; Mar. 2014; MaRS Market Insights (Year: 2014).*

(Continued)

*Primary Examiner* — Naeem U Haq
*Assistant Examiner* — Norman Donald Sutch, Jr.
(74) *Attorney, Agent, or Firm* — Jay Wahlquist; Andrew D. Wright; Roberts Mlotkowski Safran Cole & Calderon, P.C.

(57) ABSTRACT

Systems and methods for providing a food product recommendation are disclosed. A computer-implemented method includes: determining, by a computing device, that a user with a mobile device enters a store; obtaining, by the computing device, user data that is based on wearable health data, taste data, and preference data of the user; obtaining, by the computing device, store data for plural food products; determining, by the computing device, a recommended food product from the plural food products based on comparing the user data to the store data; and providing, by the computing device, an indication of the recommended one of the plural food products for display on the mobile device of the user. The user data may be that of a single user or plural users, such as a family.

20 Claims, 6 Drawing Sheets

(56) References Cited

U.S. PATENT DOCUMENTS

| | | | |
|---|---|---|---|
| 2007/0079012 A1* | 4/2007 | Walker | G06Q 20/32 |
| | | | 709/249 |
| 2010/0017265 A1 | 1/2010 | Weingarten et al. | |
| 2011/0166881 A1 | 7/2011 | Brazzo et al. | |
| 2013/0004923 A1* | 1/2013 | Utter, II | G06F 19/3475 |
| | | | 434/127 |
| 2013/0013327 A1* | 1/2013 | Horseman | G06F 19/3418 |
| | | | 705/1.1 |
| 2013/0095459 A1* | 4/2013 | Tran | A61B 5/6816 |
| | | | 434/247 |
| 2013/0216982 A1* | 8/2013 | Bennett | G09B 5/00 |
| | | | 434/127 |
| 2013/0226729 A1* | 8/2013 | Reed | G06Q 30/0631 |
| | | | 705/26.7 |
| 2014/0095285 A1 | 4/2014 | Wadell et al. | |
| 2014/0129007 A1 | 5/2014 | Utter, II | |
| 2014/0236759 A1* | 8/2014 | Mirabile | G06Q 30/0633 |
| | | | 705/26.8 |
| 2015/0019342 A1 | 1/2015 | Gupta | |
| 2015/0193588 A1* | 7/2015 | Nemoto | G06Q 50/22 |
| | | | 705/2 |
| 2015/0366098 A1* | 12/2015 | Lapetina | G04B 37/1486 |
| | | | 361/807 |

FOREIGN PATENT DOCUMENTS

| | | |
|---|---|---|
| WO | 2014159749 A1 | 10/2014 |
| WO | 2015033152 A2 | 3/2015 |

OTHER PUBLICATIONS

Carme Carrion, et al; "Wearable Lifestyle Tracking Devices: Are They Useful for Teenagers?", Sep. 11, 2015; UBICOMP/ISWC '15 Adjunct, Sep. 7-11, 2015, Osaka, Japan (Year: 2015).*

Mell et al., "The NIST Definition of Cloud Computing", NIST, Special Publication 800-145, Sep. 2011, 7 pages.

* cited by examiner

IN-STORE REAL-TIME FOOD ITEM SELECTION RECOMMENDATIONS

BACKGROUND

The present invention relates generally to providing food product recommendations to consumers and, more particularly, to providing food product recommendations in real-time in a store setting based on data obtained by a wearable computer device.

A very important part of living healthy is eating healthy foods and avoiding foods that do not suit you and/or your family. Healthy food choices are often overlooked, as evidenced by numerous health related problems that are traceable to poor diet. While physical activity can address some problems, food intake and food quality are also highly important factors needed to tackle unhealthy habits. At the same time people prefer eating food that satisfies their tastes and fit within their price range as well as their family preferences.

SUMMARY

In an aspect of the invention, a computer-implemented method includes: determining, by a computing device, that a user with a mobile device enters a store; obtaining, by the computing device, user data that is based on wearable health data, taste data, and preference data of the user; obtaining, by the computing device, store data for plural food products; determining, by the computing device, a recommended food product from the plural food products based on comparing the user data to the store data; and providing, by the computing device, an indication of the recommended one of the plural food products for display on the mobile device of the user.

In another aspect of the invention, there is a computer program product for providing a food product recommendation. The computer program product includes a computer readable storage medium having program instructions embodied therewith. The program instructions are executable by a computing device to cause the computing device to: obtain a nutrition vector based on wearable health data of a customer; obtain a taste vector based on taste data of the customer; obtain a preference vector based on preference data of the customer; create a customer vector from the nutrition vector, the taste vector, and the preference vector; identify food products in a store; match the customer vector to respective food product vectors of the food products; and recommend one of the food products based on the comparing and for displaying on a mobile device.

In another aspect of the invention, there is a system for providing a food product recommendation. The system includes a CPU, a computer readable memory and a computer readable storage medium associated with a computing device. The system includes: program instructions to obtain a nutrition vector based on wearable health data of a customer; program instructions to obtain a taste vector based on taste data of the customer; program instructions to obtain a preference vector based on preference data of the customer; program instructions to create a customer vector from the nutrition vector, the taste vector, and the preference vector; program instructions to identify food products in a store; program instructions to match the customer vector to respective food product vectors of the food products; and program instructions to recommend one of the food products based on the comparing and for displaying on a mobile device. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to providing food product recommendations to consumers and, more particularly, to providing food product recommendations in real-time in a store setting based on data obtained by a wearable computer device. Aspects of the invention leverage the advent of wearable technology to address problems associated with poor dietary choices. With hundreds of wearable computer devices and connected health tools on the market, users can track almost any aspect of their health in real-time and averaged over a period of time, without even having to think about it. Wearable computer devices and technology can monitor numerous aspects of human health including: glucose levels, heart rate, calorie intake, calories spent, blood pressure, sweat and almost any other aspect of health and vital parameters that could be monitored. These aspects are expanding further with research and advancements of technology.

Implementations of the invention map monitored data from a wearable computer device into nutrition requirements, and translate the nutrition requirements into in-store food product recommendations. In embodiments, the in-store food product recommendations are also based one or more of taste preferences, price preferences, brand preferences, and medical data. Recommendations made in this manner can help customers get health and satisfaction from the food they purchase. In embodiments, the recommendations are made and presented to the customer in real-time in a store environment, e.g., when the customer is walking the aisles in a store stocked with food items. In this manner, implementations of the invention leverage health data collected from wearable computer devices of individual customers and family members to recommend food items in real time in store aisles, with additional consideration to past medical records, allergies and physician inputs, derived taste and other customer preferences.

Aspects of the invention utilize real-time and averaged wearable health data of individual and family members to make automated real-time healthy food product recommendations while customers walk through in-store aisles. Additional aspects of the invention utilize clustering algorithms and association rules on customer's profile data, past purchase history, and preferences with data from similar customers to derive customer's taste preferences to make automated real-time food product recommendations which satisfy customers' tastes while they walk through in-store aisles. Further aspects of the invention employ a data driven approach with wearable computer devices and analytical models (e.g., clustering and association rules) to derive and make automated optimal food product recommendations in real-time while customers walk through in-store aisles, which meet the nutrition needs and taste desires of the customer and the family.

As used herein, wearable health data refers to user health data collected by a wearable computer device that is worn by the user. Wearable health data may be monitored, collected, and averaged in real time by the wearable computer device that is worn by the user. Wearable health data differs from medical data (e.g., physician records, allergies, prescriptions, etc.) of the user. Aspects of the invention may employ both wearable health data and medical data to make real-time in-store food product recommendations. The use of wearable health data makes the recommendations provided by implementations of the invention more relevant to a user's dietary needs compared to recommendations that may be made based on medical data alone.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
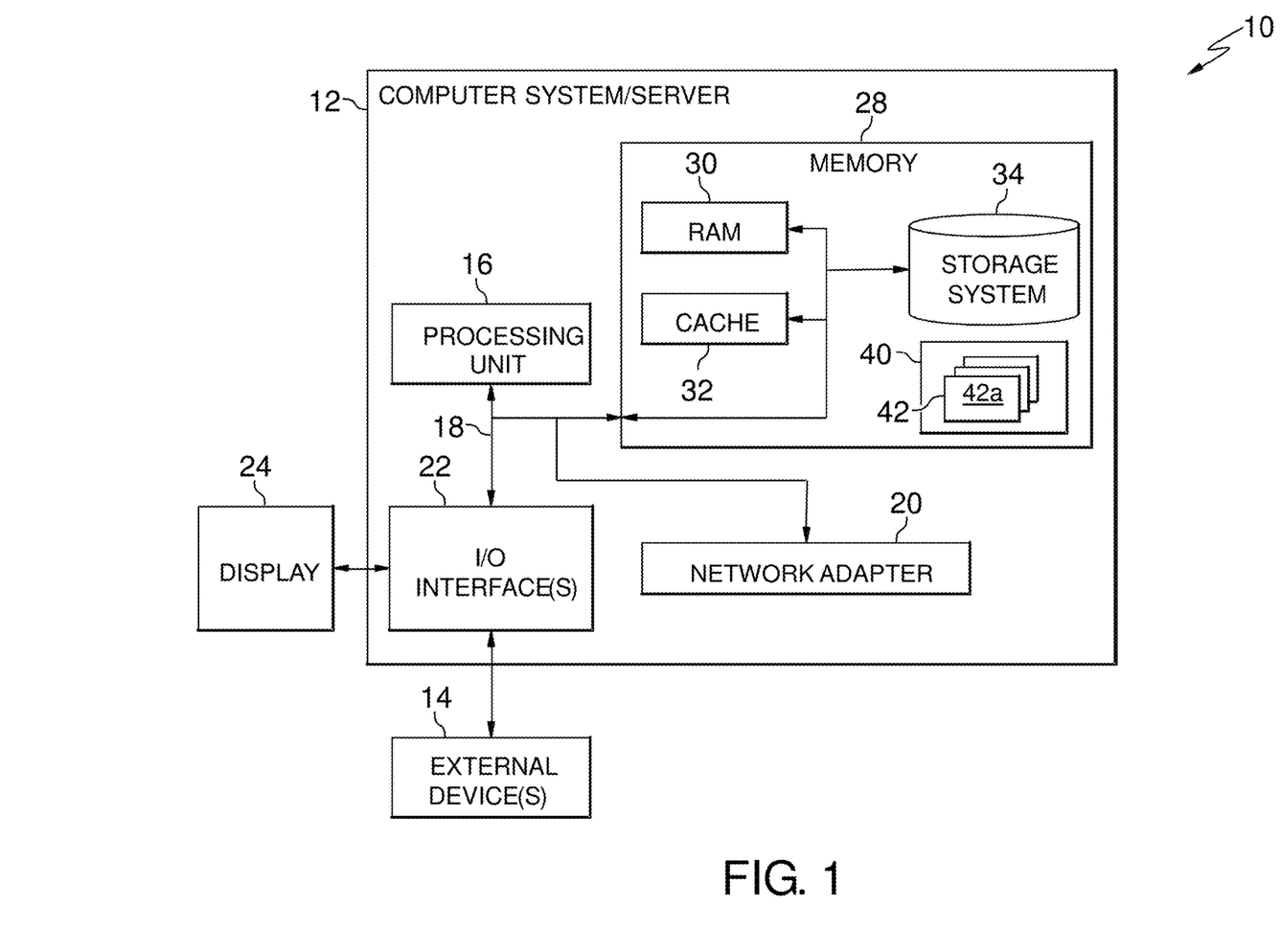
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
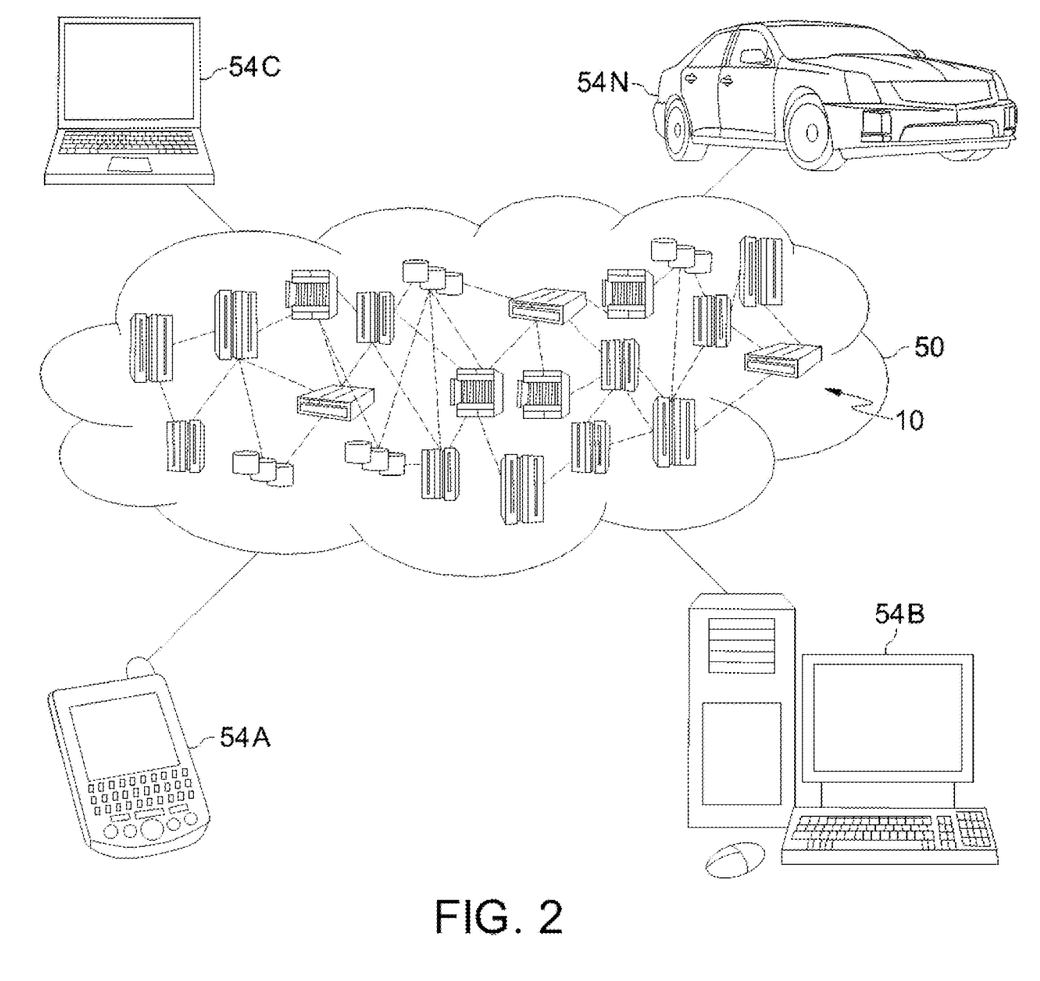
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
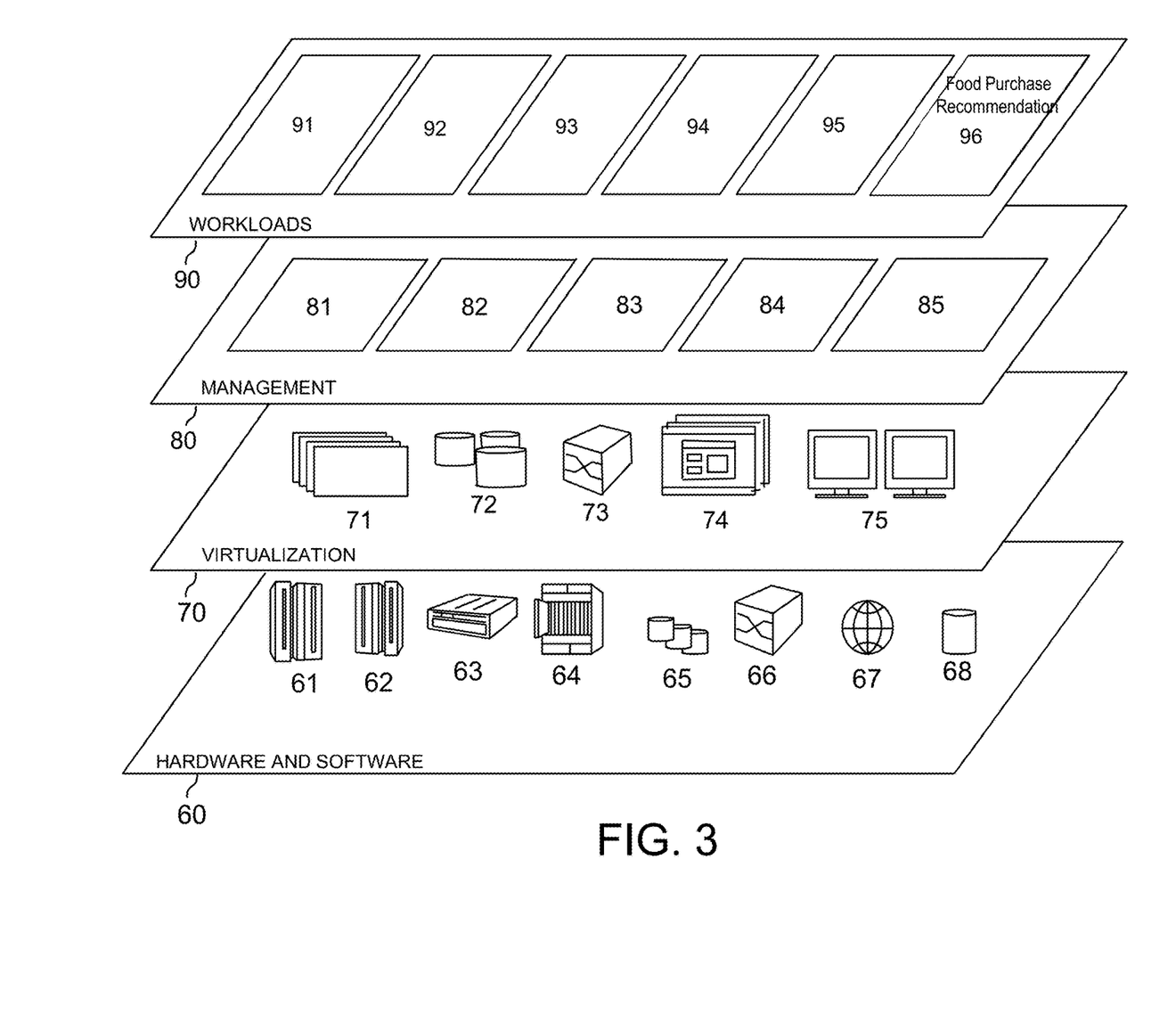
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and food purchase recommendation 96.

Referring back to FIG. 1, the program/utility 40 may include one or more program modules 42 that carry out the functions and/or methodologies of aspects of the invention as described herein. Specifically, the program modules 42 may include a recommendation module 42a that determines and presents recommendation for a food product to a user in real-time while the user in a store. In accordance with aspects of the invention, the recommendation module 42a determines the recommendation based on wearables health data, medical records data, preference data, and data associated with the available food items in the store.

Figure 4:
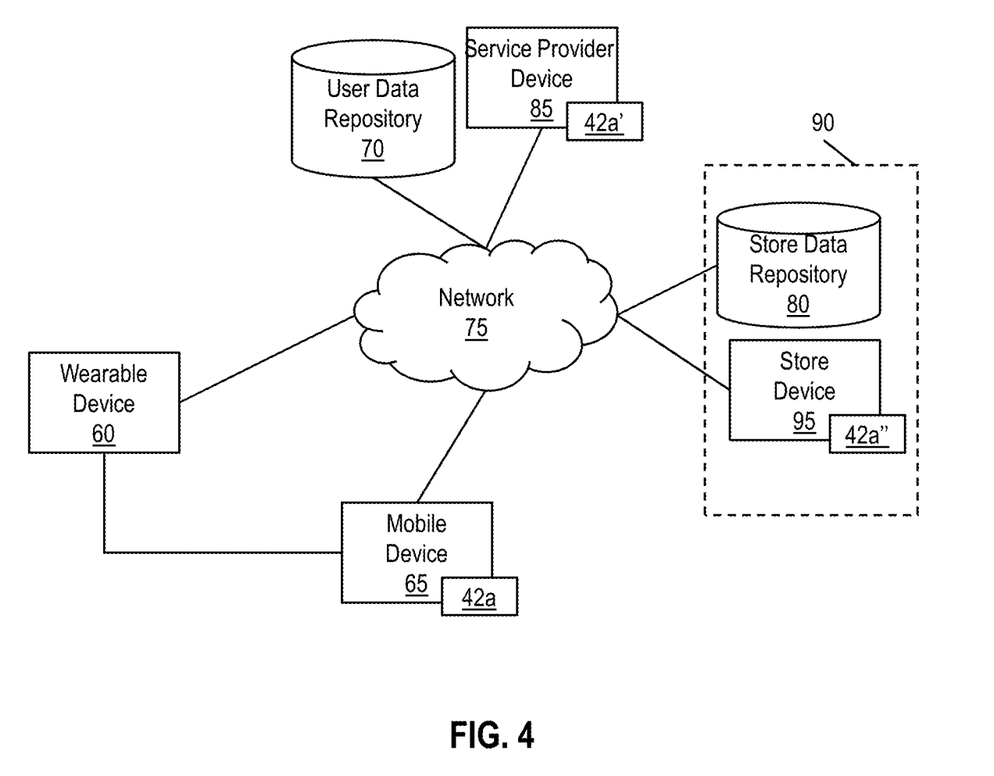
FIG. 4 shows a computing environment in accordance with aspects of the invention.

FIG. 4 shows a computing environment in accordance with aspects of the invention. The environment includes at least one wearable device 60 associated with a user. The wearable device 60 may comprise any suitable wearable computer device that is configured to monitor at least one health parameter of the user when the wearable device 60 is worn by the user. For example, and without limitation, the wearable device 60 may comprise a smartwatch, health monitor, or headset that is configured to monitor and collect wearable health data such as heart rate, blood glucose level, pulse, blood pressure, or cholesterol level. In embodiments, the user wears the wearable device 60 to monitor and collect wearable health data on one or more of these or other health related parameters. The at least one wearable device 60 may comprise plural different wearable devices, such as respective wearable devices associated with different members of a family.

The environment of FIG. 4 also includes a mobile device 65 associated with the user. The mobile device 65 may comprise any suitable mobile computing device, such as a smartphone, tablet computer, laptop computer, personal digital assistant, etc. In embodiments, the mobile device 65 and the at least one wearable device 60 are configured to wirelessly communicate with each other using a wireless communication protocol, such as WiFi, Bluetooth, near field communication (NFC), etc. The wireless communication between the devices 60 and 65 may include authentication mechanisms such as, for example, user name and password. In this manner, the at least one wearable device 60 may transmit data to the mobile device, where the transmitted data is wearable health data (i.e., data defining one or more of the health related parameters that is monitored and collected by the at least one wearable device 60). In this manner, the mobile device 65 has a copy of the user's wearable health data.

Still referring to FIG. 4, the environment also includes a user data repository 70. In embodiments, the user data repository 70 comprises a computer storage device at a node in a cloud environment (e.g., a node 10 in a cloud computing environment 50 as shown in FIG. 2). Specifically, the user data repository 70 may be a private shared cloud repository. The at least one wearable device 60 and the mobile device 65 may each communicate with the user data repository 70 via a network 75, such as the Internet, WAN, or LAN. In embodiments, the wearable health data is transmitted from the at least one wearable device 60 or the mobile device 65 to the user data repository 70 and stored at the user data repository 70. In this manner, the wearable health data is stored at the user data repository 70 and is accessible from the at least one wearable device 60 or the mobile device 65. In embodiments, the user data repository 70 also stores medical data of the user, taste data for the user, and preference data of the user.

With continued reference to FIG. 4, the environment includes a store data repository 80 that includes a computer storage device associated with a store that sells food items. In embodiments, the store data repository 80 stores data defining what food items are in stock in the store, an in-store location of each food product that is in stock (e.g., an aisle number), a price of each food product that is in stock, and predefined data (e.g., ingredients, brand, health related, warnings etc) associated with each food product that may be used to match (e.g., compare) to the user data (from the user data repository 70) for making food product recommendations.

Still referring to FIG. 4, the environment also includes the recommendation module 42a that is configured to match (e.g., compare) the user data (from the user data repository 70) to the store data (from the store data repository 80), and determine a food product recommendation for the user based on the comparison. In embodiments, the recommendation module 42a determines which food products to match to the user data based on at least one of: food products that are included in the user's electronic grocery list, and the location of the user within the store (e.g., which aisle or section the user is walking in). The recommendation module 42a may be executed at different respective computer devices in the environment depending on desired levels of speed and data security.

In one embodiment, the recommendation module 42a resides on the user mobile device 65. In this embodiment, when a user enters the store with their mobile device 65, the mobile device 65 obtains a store identifier of the store (e.g., from a store computer device, or determined via GPS, etc.). The recommendation module 42a on the mobile device 65 then calls the user data repository 70 with a user identifier to obtain user data for this user, and calls the store data repository 80 with the store identifier to obtain the store data for this store. Upon receiving the user data and the store data from the repositories 70, 80, the recommendation module 42a on the mobile device 65 matches the data for determining a recommended food product, and presents the recommended food product on a display of the mobile device 65.

In another embodiment, the recommendation module 42a' resides on a third party (e.g., service provider) computer device 85, such as at node in a cloud environment (e.g., a node 10 in a cloud computing environment 50 as shown in FIG. 2). For example, the recommendation module 42a' may reside on a computer device associated with the user data repository 70. In this embodiment, when the user carrying the mobile device 65 enters the store, the mobile device 65 obtains a store identifier of the store (e.g., from a store computer device, or determined via GPS, etc.), and the mobile device 65 sends (transmits) the store identifier and a user identifier to the recommendation module 42a'. The recommendation module 42a' then obtains the store data from the store data repository 80 based on the received store identifier, obtains the user data from the user data repository 70 based on the received user identifier, matches the store data to the user data, determines a recommendation for a food product based on the comparison, and sends (transmits) data defining the recommendation to the mobile device 65 which displays the recommendation.

In another embodiment, the recommendation module 42a" resides on a computer device associated with the store 90 (e.g., grocery store). For example, the recommendation module 42a" may reside on a computer device 95 associated with the store data repository 80. In this embodiment, when the user carrying the mobile device 65 enters the store, the mobile device 65 sends (transmits) a user identifier to the recommendation module 42a." The recommendation module 42a" then obtains the store data from the store data repository 80, obtains the user data from the user data repository 70 based on the received user identifier, matches the store data to the user data, determines a recommendation for a food product based on the comparison, and sends (transmits) data defining the recommendation to the mobile device 65 which displays the recommendation.

Regardless of its location, the recommendation module 42a matches the user data to the store data to provide a real-time food product recommendation for display on the mobile device 65 while the user is in the store. In embodiments, the comparison is performed using vectors as described herein. However, implementations of the invention are not limited to comparisons made using vectors, and other techniques may be used to match the user data to the store data to provide a real-time in-store food product recommendation on the user's mobile device.

In embodiments, the wearable health data is stored at the user data repository 70 in the form of a health vector for each user (e.g., per family member). For example, the health vector may take the form of: HV[HVD1, HVD2, HVD3, . . . , HVDn] where HVD1 is a first dimension of the health vector HV, HVD2 is a second dimension of the health vector, HVD3 is a third dimension of the health vector, and HVDn is an nth dimension of the health vector. Each dimension of the health vector may correspond to a respective parameter of the wearable health data that is collected by the wearable device 60. The health vector may also include respective dimensions for other data associated with the user, such as age (numeric value), gender (male or female), diabetic status (yes or no), high blood pressure status (yes or no), high cholesterol status (yes or no). The dimensions in the health vector can also include values related to historical medical records and physician inputs. An exemplary health vector for a user individual M1 may be represented as:

$HV_{M1}$ [Gender: Male, Age: 42, Diabetic: Yes, High Blood Pressure: No, High Cholesterol: Yes, . . . , HVDn]

The health vector for user individual M1 may include dimensions associated with wearable health data, such as pulse, blood pressure, and heart rate of user M1. In aspects of the invention the wearable health data (e.g., the data collected by the at least one wearable device 60) is mapped into predefined nutrition requirements and/or dietician's charts to derive nutrition requirements for the individual user or the family. The mapping may be performed, for example, by an appropriately programmed computing device associated with the user data repository 70. For example, the nutritional requirement of a particular user (e.g., family member) may be derived by combining the wearable health data of the user with nutritional requirements for a corresponding healthy individual (e.g., with a similar health vector). The output of this step is a determination that the individual M1 requires or should have the following nutrition over "y" days, represented by exemplary nutrition vector $NV_{M1}$ assuming individual M1 is shopping food for y days:

$NV_{M1}$ [Protein: 50 gms*y, Fat: 70 gms*y, Carbohydrates: 310 gms*y, Sugars: 30 gms*y, Sodium (salt) 2.5 gms*y]

The health and nutrition needs of the family members are stored with ranges for general requirements of the family members. The storage system also allows for storing specific nutrition requirements, preferences and medical data (e.g., data from medical records) of individual family members.

In embodiments, the user data stored at the user data repository 70 may also include taste preference data. For example, the taste preferences of the family members are derived from individual user preferences, purchase history, cultural food and taste preferences, reviews data, applying clustering and association rules with data from similar customers etc. For example, the system may receive input from a user (e.g., via the mobile device 65a) in which the user indicates taste preferences. The system may also track and analyze the user's past food purchases to determine taste preferences. The taste data is stored as a vector, i.e. the exemplary taste vector of individual M1 is:

$TV_{M1}$ [Sweet: High, Salty: Low, Sour: No, Tangy: Medium, . . . , TVDn]

The taste data in the taste vector may also be stored per type of food. The taste vector is not limited to the dimensions (Sweet, Salty, Sour, Tangy) shown in the exemplary taste vector TVM1, and more or less dimensions and other types of dimensions TVDn (e.g., Spicy) may be used.

In embodiments, the user data stored at the user data repository 70 may also include customer preference data such as price preference and brand preference data. For example, a price that individual M1 is willing to pay for each type of food item, a preferred brand for each type of food item, a manufacture date, a best by/expiry date and other preference data may also be set on the user device 65a. The customer preference data may also be stored as vector, such as the following exemplary preference vector for individual M1:

$PV_{M1}$ [Price Range: p1-p2 US dollars, Brand: CompanyA, . . . , PVDn]

The preference data in the preference vector may also be stored per type of food. The preference vector is not limited to the dimensions (Price Range, Brand) shown in the exemplary taste vector PVM1, and more or less dimensions and other types of dimensions PVDn (e.g., Best Used By Date) may be used.

In embodiments, the store data stored at the store data repository 80 includes data in relevant comparable dimensions for each food product which data is used to match to the data stored in the dimensions of the nutrition vector NM, taste vector TV, and preference vector PV. For example, food product segments in the store aisles may have RFID tags storing the serial number, price, ingredients and any other health-related factors about the food product and these data are also stored in the store data storage. Each food product in the store may have a unique food vector that has dimensions that correspond to dimensions of the nutrition vector NM, taste vector TV, and preference vector PV. For example, a food vector for food product P1 may be given as:

$FV_{P1}$ [Protein: value1, Fat: value2, Carbohydrates: value3, Sugars: value4, Sodium: value5, Sweet: value6, Salty: value7, Sour: value8, Tangy: value9, Price: value10, Brand: value11, ... ]

The data for each of the values (value1, value2, ..., valueN) of the food vector $FV_{P1}$ may be predefined and stored in a data structure in the store data repository 80. The data structure for food product P1 may include other data, such as a unique identifier for the food product P1, a location of the food product P1 in the store (e.g., aisle number, shelf number). Each food product in the store may have its own respective food vector. The data in each food vector may be predefined, e.g., by the store and/or a service provider. In this manner, the values of the dimensions of the food vector for any food product in the store may be compared to the values of the corresponding dimensions of an individual or family's nutrition vector NM, taste vector TV, and preference vector PV. Based on the comparisons, each food product in the store may be provided with a respective score, and the food items may be ranked relative to one another based on these determined scores.

Referring still to FIG. 4, in accordance with a particular exemplary embodiment of the invention, when the individual M1 possessing the mobile device 65 enters the store 90 and walks past a food isle while looking intently at the food racks, visual sensors are activated and communicate with the registered mobile device 65. The system comprising the recommendation module 42a'' (or 42a or 42a') can also utilize a grocery list on the mobile device 65 to determine intent to purchase different types of food products. The system comprising the recommendation module 42a'' (or 42a or 42a') uses the nutrition requirements of individual M1 and family members as per individual M1's preset preferences on the mobile device 65 or during registration with the in-store system. The preferences can be overridden from the mobile device 65 at any point of time depending on individual M1's shopping needs for that visit. The RFID device on each food product is activated when individual M1 enters an associated area (e.g., an aisle) in the store. The recommendation module 42a'' (or 42a or 42a') computes the nutritional facts of the food product in the segment with individual M1 and family's nutrition requirements. The recommendation module 42a'' (or 42a or 42a') also considers food allergies, medical records, prescriptions and specific preferences of individual family members, stock to provide individual M1 with the right choices. Alternatives to out of stock products which meet the criteria are also provided. The location of each product type will be uniquely identifiable in the store with aisle, rack, bin numbers etc. The system sends the recommendations into M1's mobile device 65 with part number, description, image and exact location of the product with the aisle, rack, bin numbers etc.

In implementations of the particular exemplary embodiment, the step of determining recommendations is implemented by matching all the dimensions of the customer vectors (the customer vector CV is a combination of the nutrition vector NV, the taste vector TV, and the preference vector PV) with the corresponding dimensions of each food product (food vector FV). For example, a match in a dimension is counted as 1 and a mismatch is counted as 0. The final match score calculated per customer vector-food vector combination ($CV_{M1}$-FVn) is the addition of the counts (1 or 0 for each dimension) for all the dimensions of the particular food product. The food product per product type with the highest score for a customer is the closest match. The recommendations are made with consideration to stock of food products present in the store. Closer matches may be recommended if closest matching product with highest score is out of stock.

In embodiments, the system comprising the recommendation module 42a'' (or 42a or 42a') analyzes the data collected to provide feedback to food manufacturers on consumer needs and clusters to allow them to produce better food products as per determined needs of the consumers.

In embodiments, the wearable devices 60 provide data that is analyzed to determine whether the user's food product choices are improving the health of the user and/or the user's family. By analyzing this data over periods of time, the system comprising the recommendation module 42a'' (or 42a or 42a') learns to provide better recommendations with clustering and association amongst consumers with similar nutritional needs based on similar health parameters.

Figure 5:
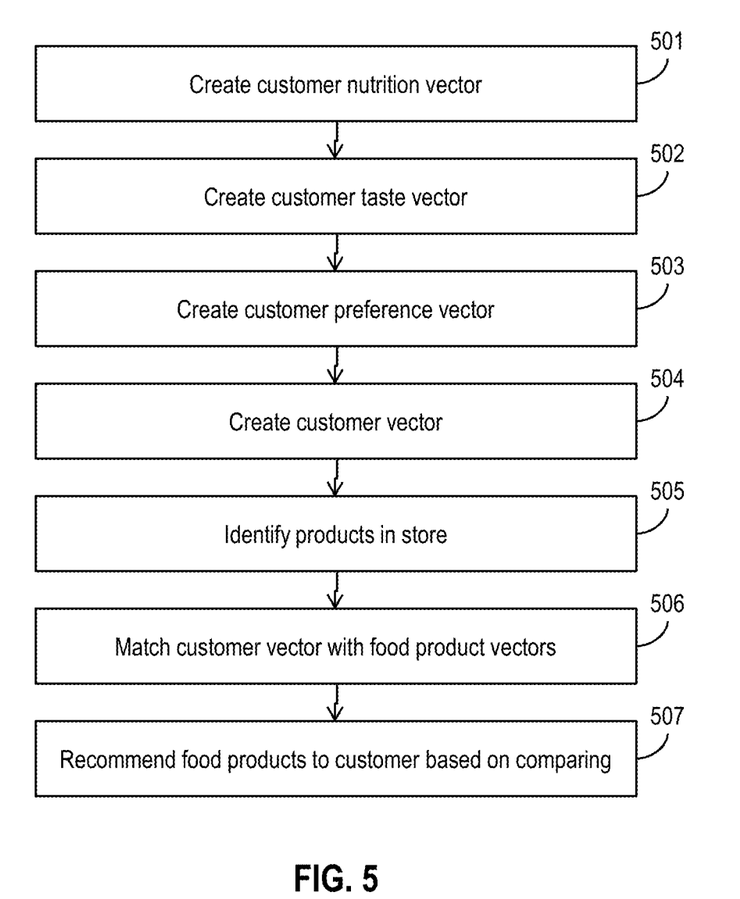
FIGS. 5 and 6 show flowcharts of methods in accordance with aspects of the invention.
Figure 6:
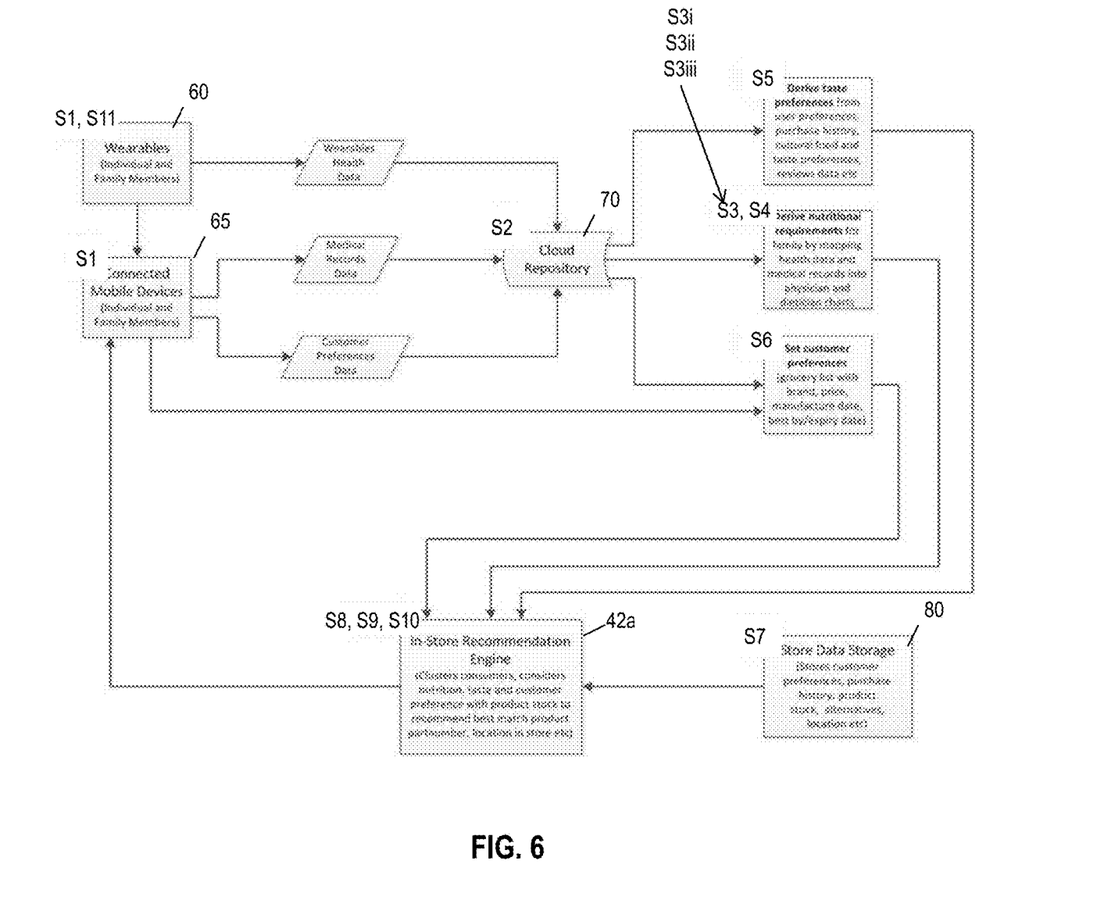

FIGS. 5 and 6 show flowcharts of methods in accordance with aspects of the invention. Steps of the methods of FIGS. 5 and 6 may be performed by devices in the environment illustrated in FIG. 4 and in the manner described with respect to FIG. 4.

At step 501, a customer nutrition vector is created. In embodiments, using the customer and family's wearables data and medical data for a customer and family, the system maps and derives nutritional requirements and creates a customer nutrition vector.

At step 502, a customer taste vector is created. In embodiments, the system derives taste preferences and creates a customer taste vector using at least one of: customer and family purchase history, cultural food and taste preferences, review data, and clustering and association rules with data from similar customers.

At step 503, a customer preference vector is created. In embodiments, the system creates the customer preference vector based on at least one of: customer preferences from customer profile and set preferences, and derived preferences from clustering and association with similar customers.

At step 504, a customer vector is created. In embodiments, the system creates a customer vector by combining all the dimensions of the customer and family's nutrition, taste and preference vectors for each food product in the customer's purchase list for a particular store visit.

At step 505, products in the store (e.g., grocery store) are identified. In embodiments, the system identifies available products matching the customer's purchase list for the visit, as the customer walks down a store aisle. Each food product may have its serial number, price, ingredients and any other health-related factors about the food product stored in RFID tags. In addition the store data repository holds data for each relevant comparable dimension of the customer nutrition, taste, preference vectors in a vector defined per each food product, which can be retrieved from the store data repository for matching with customer vectors.

At step 506, the customer vector is compared to the food product vectors. In embodiments, the system performs vector matching of customer vectors with food product vectors and calculates a match score per each customer vector and food vector combination.

At step 507, recommendations are made to the customer based on the comparing from step 507. In embodiments, the system recommends food product choices to the customer based on the best matches indicated with highest calculated match scores.

In embodiments, the method includes determining that the mobile device has entered the store. This may be performed by a compute device of the store automatically detecting the presence of the mobile device in the store, by the user of the mobile device indicating a location in the store, or other device location techniques. In embodiments, the vectors may comprise data structures that are stored in computer memory.

FIG. 6 shows a block diagram that illustrates components and steps in accordance with aspects of the invention. Specifically, FIG. 6 shows a wearable device 60, mobile device 65, user data repository 70, store data repository 80, and recommendation module 42a as described with respect to FIG. 4. The recommendation module 42a may reside at the mobile device 65, service provider (e.g., recommendation module 42a' as in FIG. 4) or store device (e.g., recommendation module 42a" as in FIG. 4). The steps indicated in FIG. 6 may be performed in a manner similar to that described with respect to FIG. 4.

At step S1, wearable health data is collected from one or more wearable devices 60 and provided to the mobile device 65. At step S2, the wearable health data is uploaded to the user data repository 70. Step S2 may also include the user's medical data, taste data, and preference data being uploaded to the user data repository 70.

At step S3, the wearable health data (e.g., the data collected by the at least one wearable device 60) is mapped into predefined nutrition requirements and/or dietician's charts to derive nutrition requirements for the individual user or the family. Step S3 may include creating the nutrition vector (NV).

At step S4, the health and nutrition needs of the family members are stored with ranges for general requirements of the family members. The storage system also allows for storing specific nutrition requirements, preferences and medical records of individual family members.

At step S5, the taste vector (TV) is created. At step S6, the preference vector (PV) is created. At step S7, the food product vector (FV) is created for each food product in the store.

At step S8, the mobile device 65 registers or communicates with the store computer device for determining that the mobile device is in the store. At step S9, while the user and mobile device 65 are inside the store, the recommendation module 42a (or 42a' or 42a") obtains the user data (customer vector) and the store data (food product vectors) and determines a recommended food product. Step S9 may also include communicating the recommended food product to the mobile device 65 and displaying the recommendation on the mobile device 65 while the user is inside the store.

At step S10, the system analyzes the data collected to provide feedback to food manufacturers on consumer needs and clusters to allow the manufacturers to produce better food products as per needs of the consumers. At step S11, the wearable devices detect whether the nutrition is improving the health of the family.

In embodiments, at step S3, the data collected in step S2 per individual family member is combined with nutritional requirements for a corresponding healthy individual (with similar health vector) and the nutritional requirement of the family member is derived. The system can leverage data for each individual family member or combine the data for all family members to derive the data for the family. At step S3i, while combining the data for all family members to derive the health vector for the family, the algorithm may detect that a range may need to be defined as value for a dimension in the health vector to map to a dimension value in the nutrition vector. At step S3ii, if the difference between the health dimension values of two family members varies greater than a pre-defined permissible range width for that dimension, the health vectors for the family members may be kept separate to address specific needs of each family member. At step S3iii, if the health vectors for two family members differ significantly in multiple dimensions, the health vectors for the family members may be kept separate to address specific needs of each family member.

In step S3i, if the health vector dimension values are a range within permissible width for a dimension, it implies that though the values for two family members are different, the nutritional requirements of the two family members can still be fulfilled by the same food product recommendation to meet the nutritional requirements for both family members. In steps S3ii and S3iii, if the health vectors are kept separate, it implies that the nutritional requirements of two family members are unique enough that the same food product recommendation cannot meet the nutritional requirements for both family members. This procedure of deriving the health vector for the family can be extended to all family members and the optimal number of health vectors with unique nutritional requirements is derived.

In embodiments, at step S10, the system comprising the recommendation module 42a analyzes the data collected to provide feedback to food manufacturers on consumer/customer needs and clusters of consumers with similar requirements to allow them to produce better food products as per needs of the consumers. The algorithm can detect food nutrition vector dimensions generating the most matches and mismatches with customer nutrition vector dimension values reflecting customer nutrition requirements. The mismatches may allow food manufacturers and researchers to research and innovate in those dimensions. This research can be used to create food products meeting those nutrition needs of customers and address specific health concerns and needs for homogenous clusters of customers. The matches will allow for food manufacturers, researchers and regulators to understand important nutritional needs and continue focusing on those aspects of their food products.

In embodiments, at step S11 the system comprising the recommendation module 42a tracks the food product recommended and the food product actually purchased. It also collects feedback on the food products from consumers via surveys, reviews, feedback etc. The wearable devices detect if the nutrition provided by the food products purchased as per the recommendations is improving the health of the individual and family, as applicable. This is an indirect correlation derived between food products purchased and observed insights gleaned from the wearable devices. In the event the health of the individual or family is not improving, needs to be further improved, or there are other improvement considerations based on information collected from the surveys, reviews, feedback etc, the following optimization may be performed: the width in the dimension values of the health vector may be tuned to smaller ranges, so that more unique nutritional requirements are addressed per family member; additional dimensions may be added for additional health considerations and corresponding nutritional requirements; and weights may be added to stress on particular dimensions of the health vector to adjust nutrition needs in that dimension to generate food recommendations addressing that specific nutrition need. In this manner, over time the system learns to provide better recommendations with clustering and association amongst consumers with similar nutritional needs based on similar health vectors.

The following exemplary use case further illustrates aspects of the invention and practicality in a store environment. Customer M1 is walking down the aisle in a food store to purchase beans. Customer M1's nutrition requirements are derived from M1's health data collected from M1's wearable device(s) with additional consideration to M1's physician's inputs, prescriptions, food allergies and medical records data. Customer M1's requirements mandate gluten-free beans. A vector match of M1's nutrition requirements with the nutrition content of the different types of beans indicates—kidney beans provide the best nutrition for M1 followed by brown beans.

Still referring to the exemplary use case, customer M1's taste preferences are derived from past purchase history and by applying clustering and association rules on data from customers with similar profiles. This indicates that customer M1 prefers brown beans over the other types of beans. Customer M1's set preferences indicate that the 'best by' date of the food must be a month from current date, M1's price range is from four dollars to ten dollars, and M1's preferred brand is CompanyA.

Still referring to the exemplary use case, the store generally carries CompanyA kidney beans, CompanyB brown beans, and CompanyC black beans, but only the brown beans and black beans are in stock during M1's current visit. Based on the match score of the different types of beans with the customer's nutrition, taste, and preference vectors, kidney beans from CompanyA scored the highest followed by brown beans from CompanyB and black beans from CompanyC. Since kidney beans from CompanyA are out of stock, the recommendation module recommends brown beans from CompanyB for purchase to M1 in real-time as M1 is walking down the in-store aisle.

In embodiments, the solution can be extended to all family members and different types of food products with additional dimensions in each vector. The weights on vector match can be adjusted and association rules derived based on learning over time and the effect of the purchases on customer's health from wearables data, to generate optimal recommendations.

In still additional embodiments, the invention provides a computer-implemented method for providing in-store real-time food product selection recommendations. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a computing device, that a user with a mobile device enters a store via Global Positioning System (GPS);
   obtaining, by the computing device, user data that is based on wearable health data, taste data, and preference data of the user, the wearable health data being collected in real time from a wearable computer device of the user, the wearable computer device being connected to the computing device via a network;
   obtaining, by the computing device, store data for plural food products;
   determining, by the computing device, a recommended food product from the plural food products based on comparing the user data including the wearable health data collected in real time from the wearable computer device to the store data; and
   providing, by the computing device, an indication of the recommended one of the plural food products for display on the mobile device of the user;
   wherein the wearable health data includes an average health data of the user over a period of time and averaged health data for a plurality of users over the period of time;
   the determining the recommended food product comprises determining a respective score for each of the plural food products based on the comparing the store data to the user data;
   the user data comprises a customer vector;
   the store data comprises a respective food product vector for each respective one of the plural food products;
   the customer vector comprises data from a nutrition vector, a taste vector, and a preference vector;
   the nutrition vector is derived from a health vector based on the wearable health data; and
   further comprising applying weights to dimensions of the health vector based on feedback.

2. The method of claim 1, wherein the obtaining the user data, the obtaining the store data, the determining, and the providing are performed while the mobile device is in the store.

3. The method of claim 1, wherein the determining the score for one of the plural food products comprises comparing dimensions of the customer vector to corresponding dimensions of the food product vector of the one of the plural food products.

4. The method of claim 3, wherein the determining the recommended food product comprises ranking the plural food products according to the determined scores.

5. The method of claim 1, wherein the obtaining the wearable health data comprises obtaining the wearable health data from plural wearable computer devices of the plurality of users.

6. The method of claim 1, further comprising adjusting a range of values of a dimension of the health vector based on feedback.

7. The method of claim 1, further comprising adding an additional dimension to the health vector based on feedback.

8. The method of claim 1, further comprising:
   determining a desired unavailable type of food product based on the determined scores; and
   notifying a food manufacturer of the determined desired unavailable type of food product.

9. The method of claim 1, wherein a service provider performs at least one selected from the group consisting of creating, maintaining, deploying and supporting the computing device.

10. The method of claim 1, wherein steps of claim 1 are provided by a service provider on a subscription, advertising, and/or fee basis.

11. The method of claim 1, wherein the computing device includes software provided as a service in a cloud environment.

12. The method of claim 1, wherein the wearable health data comprises: heart rate, blood glucose level, pulse, blood pressure, and cholesterol level.

13. The method of claim 1, wherein the store data defines what food products are in stock in the store, an in-store location of each food product that is in stock, a price of each food product that is in stock, and predefined data associated with each food product.

14. The method of claim 13, wherein:
the nutrition vector includes a first set of dimensions;
the taste vector includes a second set of dimensions;
the preference vector includes a third set of dimensions; and
the respective food product vectors each include the first set of dimensions, the second set of dimensions, and the third set of dimensions.

15. The method of claim 14, wherein:
the first set of dimensions includes: protein; fat; carbohydrates; sugars; and sodium;
the second set of dimensions includes: sweet; salty; and sour; and
the third set of dimensions includes: price range; and brand.

16. The method of claim 15, wherein:
the nutrition vector includes a respective customer nutrition value at each dimension of the first set of dimensions;
the taste vector includes a respective customer taste value at each dimension of the second set of dimensions;
the preference vector includes a respective customer preference value at each dimension of the third set of dimensions;
the food product vector includes a respective food product nutrition value at each dimension of the first set of dimensions;
the food product vector includes a respective food product taste value at each dimension of the second set of dimensions; and
the food product vector includes a respective food product preference value at each dimension of the third set of dimensions.

17. The method of claim 16, wherein:
the determining the recommended food product is performed while the mobile device is in the store; and
the providing the indication of the recommended one of the plural food products for display on the mobile device is performed while the mobile device is in the store; and
the providing the indication of the recommended one of the plural food products for display on the mobile device comprises transmitting a recommendation to the mobile device, the recommendation including: an image of the recommended one of the plural food products; and
the in-store location of the recommended one of the plural food products.

18. A computer program product for providing a food product recommendation, the computer program product comprising a computer readable storage medium having program instructions embodied therewith, the program instructions executable by a computing device to cause the computing device to:
obtain a real time nutrition vector based on wearable health data of a customer, the wearable health data being collected in real time from a wearable computer device of the customer, the wearable computer device being connected to the computing device via a network;
obtain a taste vector based on taste data of the customer;
obtain a preference vector based on preference data of the customer;
create a real time customer vector from the real time nutrition vector, the taste vector, and the preference vector, the real time customer vector including the wearable health data collected in real time from the wearable computer device of the customer;
identify food products in a store;
match the real time customer vector to respective food product vectors of the food products; and
recommend one of the food products based on the match and for displaying on a mobile device;
wherein the wearable health data includes an average health data of the customer over a period of time and averaged health data for a plurality of customers over the period of time;
the real time nutrition vector includes a first set of dimensions;
the taste vector includes a second set of dimensions;
the preference vector includes a third set of dimensions; and
the respective food product vectors each include the first set of dimensions, the second set of dimensions, and the third set of dimensions.

19. The computer program product of claim 18, wherein the program instructions are executable by the computing device to cause the computing device to:
determine when the mobile device enters the store; and
perform the identifying, the comparing, and the recommending while the mobile device is in the store.

20. A system for allocating computing resources for providing a food product recommendation, comprising:
a CPU, a computer readable memory and a computer readable storage medium associated with a computing device;
program instructions to obtain a real time nutrition vector based on wearable health data of a customer, the wearable health data being collected in real time from a wearable computer device of the customer, the wearable computer device being connected to the computing device via a network;
program instructions to obtain a taste vector based on taste data of the customer;
program instructions to obtain a preference vector based on preference data of the customer;
program instructions to create a real time customer vector from the real time nutrition vector, the taste vector, and the preference vector, the real time customer vector including the wearable health data collected in real time from the wearable computer device of the customer;
program instructions to identify food products in a store;
program instructions to match the real time customer vector to respective food product vectors of the food products; and program instructions to recommend one of the food products based on the match and for displaying on a mobile device, wherein the wearable health data includes an average health data of the customer over a period of time and averaged health data for a plurality of customers over the period of time;

wherein the real time nutrition vector includes a first set of dimensions;

wherein the taste vector includes a second set of dimensions;

wherein the preference vector includes a third set of dimensions; and wherein the respective food product vectors each include the first set of dimensions, the second set of dimensions, and the third set of dimensions; and wherein the program instructions are stored on the computer readable storage medium for execution by the CPU via the computer readable memory.

* * * * *